(12) United States Patent
de Souza et al.

(10) Patent No.: US 6,336,430 B2
(45) Date of Patent: *Jan. 8, 2002

(54) HYDROGEN GENERATING APPARATUS

(75) Inventors: Mario de Souza; Gabi Balan, both of Medicine Hat (CA)

(73) Assignee: FatPower Inc., Calgary (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,549

(22) Filed: Jun. 29, 1998

(51) Int. Cl.$^7$ .............................................. F02B 43/08
(52) U.S. Cl. ...................................................... 123/3
(58) Field of Search ................................ 123/3, 27 GE

(56) References Cited

U.S. PATENT DOCUMENTS

| | | | | |
|---|---|---|---|---|
| 4,099,489 A | * | 7/1978 | Bradley | 123/3 |
| 4,131,086 A | * | 12/1978 | Noguchi | 123/3 |
| 4,141,326 A | | 2/1979 | Wolber | |
| 4,147,136 A | * | 4/1979 | Noguchi | 123/3 |
| 4,200,062 A | * | 4/1980 | Duckworth | 123/3 |

(List continued on next page.)

FOREIGN PATENT DOCUMENTS

| | | | | |
|---|---|---|---|---|
| CA | 2 062 739 | | 12/1990 | |
| JP | 0113545 | * | 7/1983 | 123/3 |
| JP | 0138252 | * | 8/1983 | 123/3 |
| WO | WO9421844 | | 9/1994 | |
| WO | WO9507373 | | 3/1995 | |

Primary Examiner—Marguerite McMahon
Assistant Examiner—Jason Benton
(74) Attorney, Agent, or Firm—Bennett Jones LLP

(57) ABSTRACT

A hydrogen generating system is provided for use in internal combustion engines for increasing the efficiency of the engine and decreasing emissions from the engine. The hydrogen generating system has an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means. The invention is also directed to a controller for controlling a hydrogen generating system for use in an internal combustion engine for increasing the efficiency of the engine and decreasing emissions from the engine. The controller has at least one interface means for receiving information on the operating conditions of the hydrogen generating system, at least one control means for controlling a parameter of the hydrogen generating system, and a logic circuit connected to the interface means and control means for providing instructions to the control means in response to the information received from the interface means.

17 Claims, 10 Drawing Sheets

U.S. PATENT DOCUMENTS

| | | | | |
|---|---|---|---|---|
| 4,332,219 A | * | 6/1982 | Gonzalez | 123/3 |
| 4,344,831 A | * | 8/1982 | Weber | 123/3 |
| 4,442,801 A | | 4/1984 | Glynn | |
| 4,541,397 A | * | 9/1985 | Young | 123/27 GE |
| 4,574,752 A | * | 3/1986 | Reichert, Jr. et al. | 123/198 DB |
| 4,594,990 A | * | 6/1986 | Batchelor | 123/27 GE |
| 4,596,211 A | * | 6/1986 | Szloboda | 123/27 GE |
| 4,750,453 A | * | 6/1988 | Valdespino | 123/3 |
| 5,087,344 A | | 2/1992 | Wenske et al. | |
| 5,143,025 A | | 9/1992 | Munday | |
| 5,178,118 A | | 1/1993 | Nakamats | |
| 5,224,457 A | * | 7/1993 | Arsenault et al. | 123/27 GE |
| 5,231,954 A | | 8/1993 | Stowe | |
| 5,293,857 A | * | 3/1994 | Meyer | 123/3 |
| 5,305,714 A | | 4/1994 | Sekiguchi | |
| 5,305,715 A | | 4/1994 | Nissley | |
| 5,357,908 A | * | 10/1994 | Sung et al. | 123/3 |
| 5,359,968 A | | 11/1994 | Shiraishi | |
| 5,360,461 A | | 11/1994 | Meinzer | |
| 5,370,097 A | * | 12/1994 | Davis | 123/27 GE |
| 5,450,822 A | | 9/1995 | Cunningham | |
| 5,452,688 A | * | 9/1995 | Rose | 123/3 |
| 5,458,095 A | * | 10/1995 | Post et al. | 123/3 |
| 5,513,600 A | | 5/1996 | Teres | |
| 5,526,786 A | * | 6/1996 | Beck et al. | 123/27 GE |
| 5,691,692 A | * | 11/1997 | Herbstritt | 123/198 DB |
| 5,711,865 A | | 1/1998 | Caesar | |
| 5,787,864 A | | 8/1998 | Collier, Jr. | |
| 5,799,624 A | | 9/1998 | Hsieh | |
| 5,843,292 A | | 12/1998 | Spiros | |
| 5,997,283 A | | 12/1999 | Spiros | |

\* cited by examiner

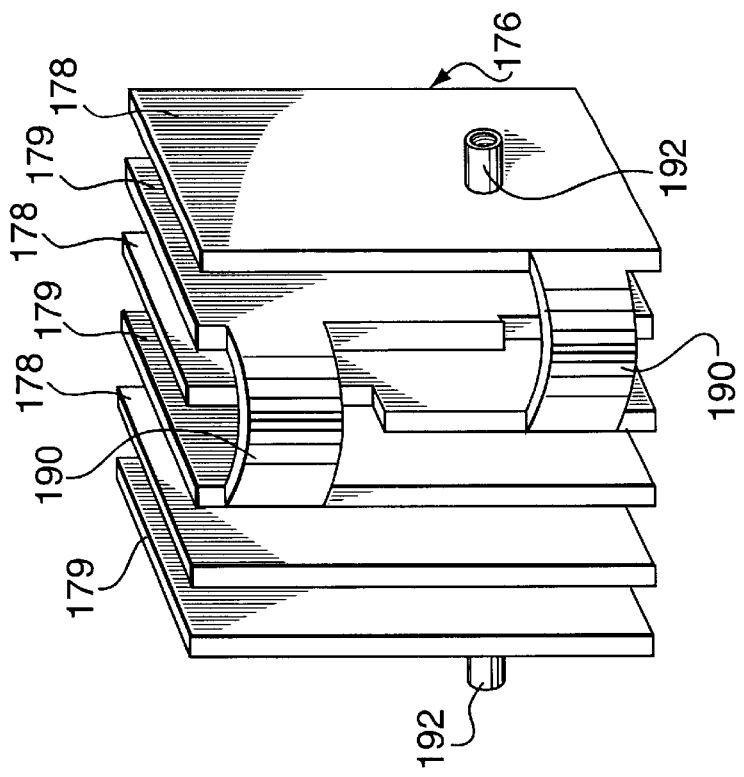
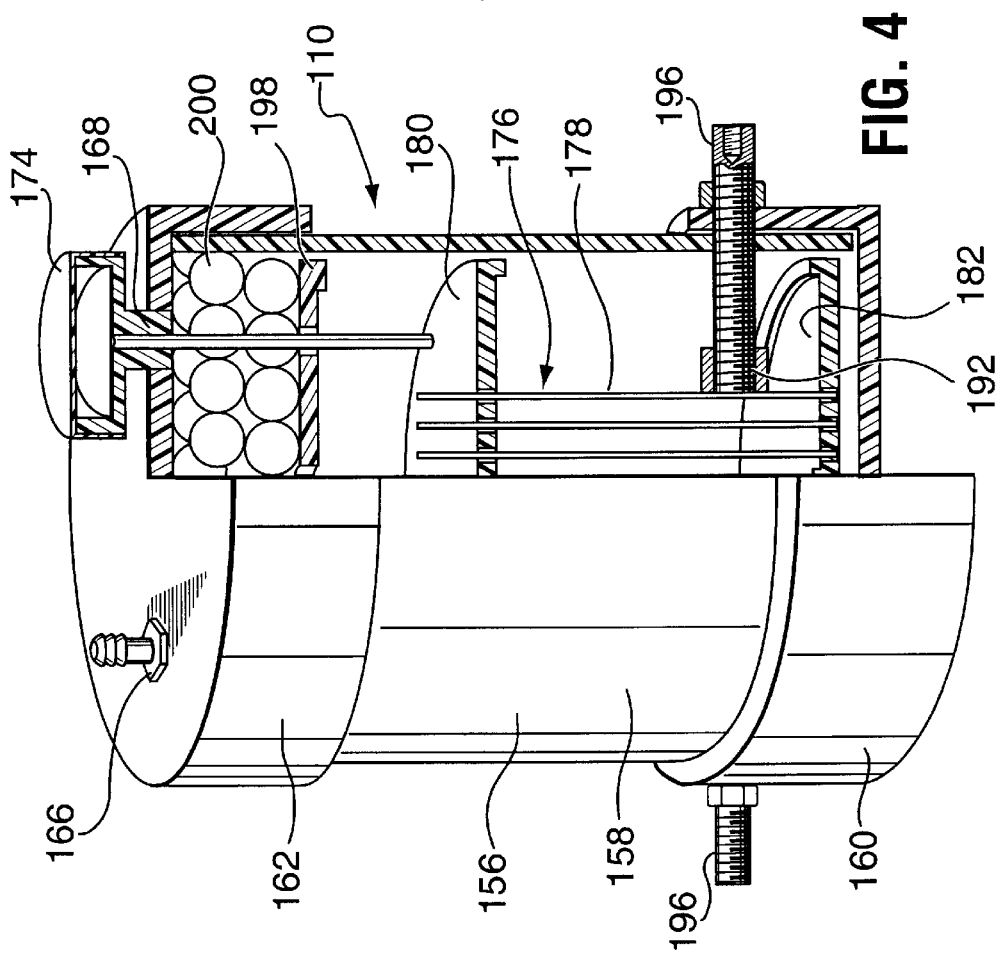
FIG. 5
FIG. 4

HYDROGEN GENERATING APPARATUS

FIELD OF THE INVENTION

The present invention is directed to a hydrogen generating apparatus and in particular a hydrogen generating apparatus for use in motor vehicles to increase the performance of the engine of the motor vehicle.

BACKGROUND OF THE INVENTION

The use of hydrogen as a supplemental fuel in motor vehicle engines has been proposed to increase the performance of the engine. Hydrogen and oxygen when used as part of the air/fuel mixture for the operation of the engine has been found to increase the performance of the engine by increasing the mileage and by reducing the amount of emissions from the engine. The hydrogen and oxygen may be generated through electrolysis of an aqueous solution with the gases given off being mixed with the charge of fuel and air supplied to the engine.

The generation of small quantities of hydrogen and oxygen using an electrolysis cell with the hydrogen and oxygen generated then being combined with the usual air/fuel mixture to improve the efficiency of internal combustion engines has being proposed in a number of prior patents. Some systems of these prior patents utilized the alternator or an auxiliary generator attached to the engine to provide the electrical power for the system.

One example of such a system is shown in U.S. Pat. No. 4,271,793. This patent describes an internal combustion engine having a fuel system for feeding an air/fuel mixture to the combustion chamber and an electrical generation system, such as an alternator. An electrolysis cell was attached adjacent to the engine to generate hydrogen and oxygen upon the application of a voltage between the cathode and the anode of the electrolysis cell. A gas feed connected the cell to the engine fuel system for feeding the hydrogen and oxygen to the engine combustion chambers. The electrolysis cell was placed under a predetermined pressure to prevent the electrolyte from boiling off. The cell also included a cooling system and other safety features.

Another electrolysis cell is disclosed in U.S. Pat. No. 5,231,954. The electrolysis cell of this patent was used for generating hydrogen and oxygen gases which were added to the fuel delivery system as a supplement to the gasoline or other hydrocarbons burned therein. The cell was designed to reduce the hazard of explosion by withdrawing the gases through a connection with the vacuum line of the positive crankcase ventilation (PCV) system of the engine and by utilizing a slip-fitted top cap for the electrolysis cell.

A further example of an electrolysis cell for use in connection with an internal combustion engine, for generating hydrogen and oxygen gases is shown in U.S. Pat. No. 5,458,095. This system utilized an electric pump to draw the hydrogen and oxygen gases out of the cell, where the outlet side of the pump was connected to the air intake manifold using a hose having a terminating insert. The insert was formed from copper tubing bent at an appropriate angle to insure that the hydrogen and oxygen gas outlet from the pump was in the same direction as the downstream airflow in the air intake manifold.

SUMMARY OF THE INVENTION

The present invention is directed to a hydrogen generating system for use in internal combustion engines for increasing the efficiency of the engine and decreasing emissions from the engine. The hydrogen generating system of the present invention comprises an electrolysis cell for generating hydrogen and oxygen gases by electrolysis of an aqueous solution, a power source for providing electrical power to the electrolysis cell, an outlet flow means for introducing the generated gases into the intake manifold system of an internal combustion engine, a monitoring means for monitoring the operating conditions of the hydrogen generating system, and a control means connected to the monitoring means for controlling the operation of the hydrogen generating system in response to the monitoring means.

In an aspect of the invention there is provided a controller for controlling a hydrogen generating system for use in an internal combustion engine for increasing the efficiency of the engine and decreasing emissions from the engine. The controller comprises at least one interface means for receiving information on the operating conditions of the hydrogen generating system; at least one control means for controlling a parameter of the hydrogen generating system; and a logic circuit connected to the interface means and control means for providing instructions to the control means in response to the information received from the interface means.

BRIEF DESCRIPTION OF THE DRAWINGS

Preferred embodiments of the present invention are illustrated in the attached drawings in which:

FIG. 4 is a side elevation view partly in cross-section of a second embodiment of an electrolysis cell of the present invention;

FIG. 5 is a perspective view of the electrode assembly of the electrolysis cell of FIG. 4;

DETAILED DESCRIPTION OF THE PREFERRED EMBODIMENT

Figure 1:
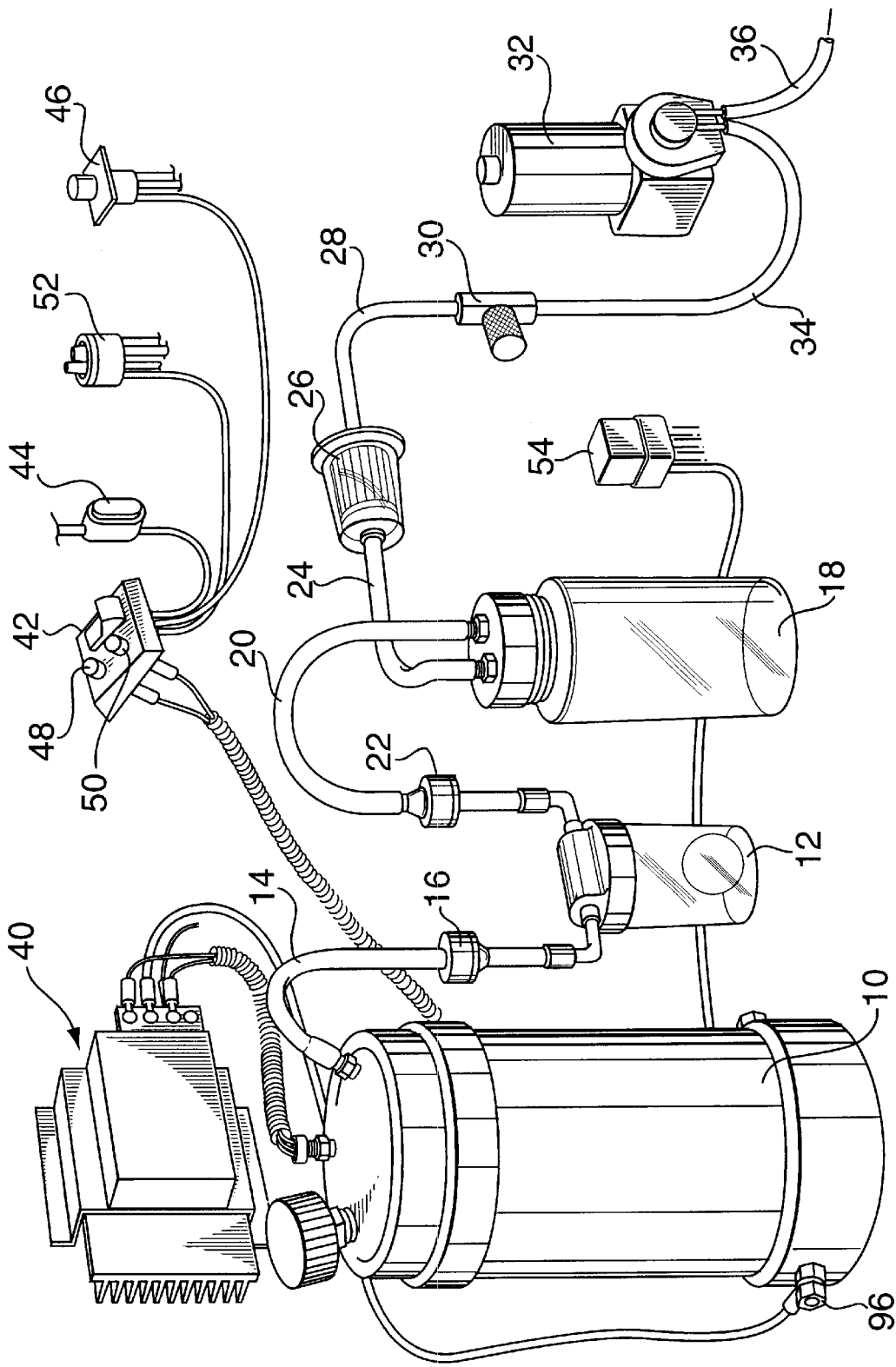
FIG. 1 is a perspective view of a preferred embodiment of the hydrogen generating system of the present invention.

A preferred embodiment of a hydrogen generating system of the present invention is illustrated in FIG. 1. The hydrogen generating system includes an electrolysis cell 10 which is used to generate the hydrogen and oxygen gases by electrolysis of a suitable aqueous medium. The gases generated by the electrolysis cell 10 are fed through a moisture trap 12 which is connected to the cell 10 by a suitable tubing 14 which is provided with a check valve 16 to prevent the back flow of fluids into the electrolysis cell 10. The output of the moisture trap 12 is connected to a bubbler 18 by means of a suitable tubing 20 which is also provided with a check valve 22 to prevent back flow of fluids. From the bubbler 18 the gases flow through tubing 24 to a filter 26 to remove any particulate material or residual moisture in the gases. From the filter 26 the gases flow through tubing 28 to a flow control valve 30 which is adjustable to regulate the flow of the gases. The output of the flow control valve 30 is connected to a pump 32 by tubing 34. The pump 32 pumps the gases to a suitable part of the intake system of the engine. The gases may be injected by the pump 32 into the intake system of the engine before the carburetor or injector by connecting the tubing 36 on the outlet of the pump 32 to the air breather box of the intake system of the engine upstream from the air filter. Alternatively the gases may be injected directly into the carburetor or other fuel delivery system of the intake system of the engine or may be injected into the intake manifold of the intake system after the carburetor or fuel delivery system if a proper filtering system is provided.

As illustrated in FIG. 1 the hydrogen generating system of the present invention includes suitable control and feedback means provided in the preferred embodiment by controller 40. The controller 40 provides for control of the operation of the hydrogen generating system to provide for maximizing efficiency under all conditions of operation of the engine as well as monitoring the system to provide for safe operation. For example, one parameter of operation of the hydrogen generating system which is preferably monitored by the controller is the level of aqueous medium in the electrolysis cell 10. As described in detail below, electrolysis cell 10 is preferably provided with a level sensor which provides feedback to the controller 40 on the level of aqueous medium in the electrolysis cell 10. If the level of the aqueous medium in the electrolysis cell 10 drops to a level which would cause enough exposure of the electrodes of the cell, the cell could be damaged or production of gases becomes inefficient. In this situation, the controller 40 will shutdown operation of the hydrogen generating system. Other parameters of the hydrogen generating system controlled by the controller 40 will be explained in detail below.

The hydrogen generating system is also provided with a master switch 42 which is preferably mounted in the motor vehicle in a location easily accessible by the operator of the motor vehicle. The master switch 42 allows the operator of the motor vehicle to turn the hydrogen generating system on and off as required or desired. The master switch 42 is connected to the electrical system of the motor vehicle with a suitably sized fuse 44. For safety reasons, the hydrogen generating system is also provided with a shutoff switch 46 which will shutdown the system when the hood of the portion of the motor vehicle where the system is located is raised. Thus if the hydrogen generating system is located in the engine compartment the shutoff switch 46 would be mounted such that raising the hood of the engine compartment will cause the switch 46 to open and shutdown the hydrogen generating system. Similarly if the hydrogen generating system is mounted in the trunk compartment the shutoff switch would be located such that raising the hood of the trunk compartment will shut off operation of the system.

The hydrogen generating system of the present invention also includes a means of determining that the engine is running so that if power is applied to the controller 40 but the engine is not actually running, no electrolysis will take place. The means to determine that the engine is running could be a sensor monitoring one or more of the engine conditions when the engine is operating. For example, a sensor could be used to monitor vacuum or oil pressure which is present in an operating engine. Preferably, a vacuum safety switch 52 is utilized to insure that the engine is running. The vacuum safety switch 52 monitors the vacuum, preferably from a different source than the vacuum intake line to the engine. While there are numerous sources of vacuum on the engine, the preferred source for monitoring of engine vacuum is the heater vacuum line. The vacuum safety switch 52 is adjusted such that should the level of engine vacuum drop below a preset level, the safety switch 52 will interact with the electronic process controller 40 to shut down the hydrogen generating system.

The hydrogen generating system is also provided with a relay or solenoid 54 which is operated by the various switches, such as the main system switch 42, oil pressure switch or vacuum safety switch 52 and hood trunk switch 46 to provide the activation and deactivation of power to the electronic process controller 40 and in turn the electrolysis cell 10 and vacuum pump 32 of the hydrogen generating system. In a preferred embodiment the relay 54 may be incorporated into the electronic process controller 40 as described in detail below.

The hydrogen generating system preferably also provides for visual feedback to the operator of the motor vehicle. In the embodiment illustrated in FIG. 1, the main system switch 42 is provided with two LED displays 48 and 50, one LED display 48 indicating when the power is turned on to the system, and the second LED display 50 to indicate trouble with the system, such as for example, if the level of electrolyte in the electrolysis cell 10 decreases to a level to cause potential problems. Alternatively, the system could be provided with a display module which would include a alphanumeric display, which can display system messages provided by the electronic process controller 40. For example, as described in detail below, on operation of the system after the ignition is turned on, the electronic process controller 40 could perform a system scan for proper operation of the components of the system and display various messages on the alphanumeric display.

The hydrogen generating system of the present invention has a number of safety features built in. One such feature is the detection of the level of electrolyte in the electrolysis cell 10. If the level of the electrolyte is below a specified limit, then a warning would be displayed to advise the operator to add fluid, preferably steam distilled water, to the cell 10. If the fluid is not added and the level is not brought up above the limit within a set period of time, the electronic process controller 40 would shut the system down and indicate the system failure. Another monitoring of the system could be the temperature of the electrolyte solution in the electrolysis cell 10. If the temperature on the fluid in the cell exceeds a certain limit, boiling of the electrolyte soulution may occur or the cell may be damaged. The safety temperature limit is set according to many factors, such as, cell design and the nature of the electrolyte solution. Preferably with the design of the preferred embodiment described below, the temperature of the electrolyte in the electrolysis cell 10 should not exceed 160° F. In order to monitor the temperature in the cell, a temperature probe may be provided to provide a feedback on the electrolyte solution temperature. If the temperature increases, the electronic process controller 40 could limit the current to the cell 10 to reduce the amount of electrolysis taking place, and there by reduce the temperature of the cell 10. Should the temperature not reduce or continue to rise, the electronic process controller 40 could shut down the electrolysis cell 10 by disrupting the power being provided to the cell 10 and restore functioning of the system if the appropriate temperature is attained.

The hydrogen generating system of the present invention also monitors the engine vacuum through the vacuum safety switch 52, as described above. If the engine vacuum drops below a preset level, then the electronic process controller 40 will shut down the system. In addition, as the preferred embodiment of the present invention utilizes the vacuum pump 32, the process controller 40 could also monitor the operation of the vacuum pump 32, particularly with respect to the electrical power being provided to the pump 32.

Should the electric circuit to the pump 32 be interrupted, then the electronic process controller 40 will shut down the system by cutting the electrical power supplied to the electrolysis cell 10. In addition, should the gas supply line of the gases generated by the electrolysis cell 10 become blocked such that the pressure in the line increases, then the electronic process controller 40 will sense that through the pump circuit and shut down the power supply.

Figure 2:
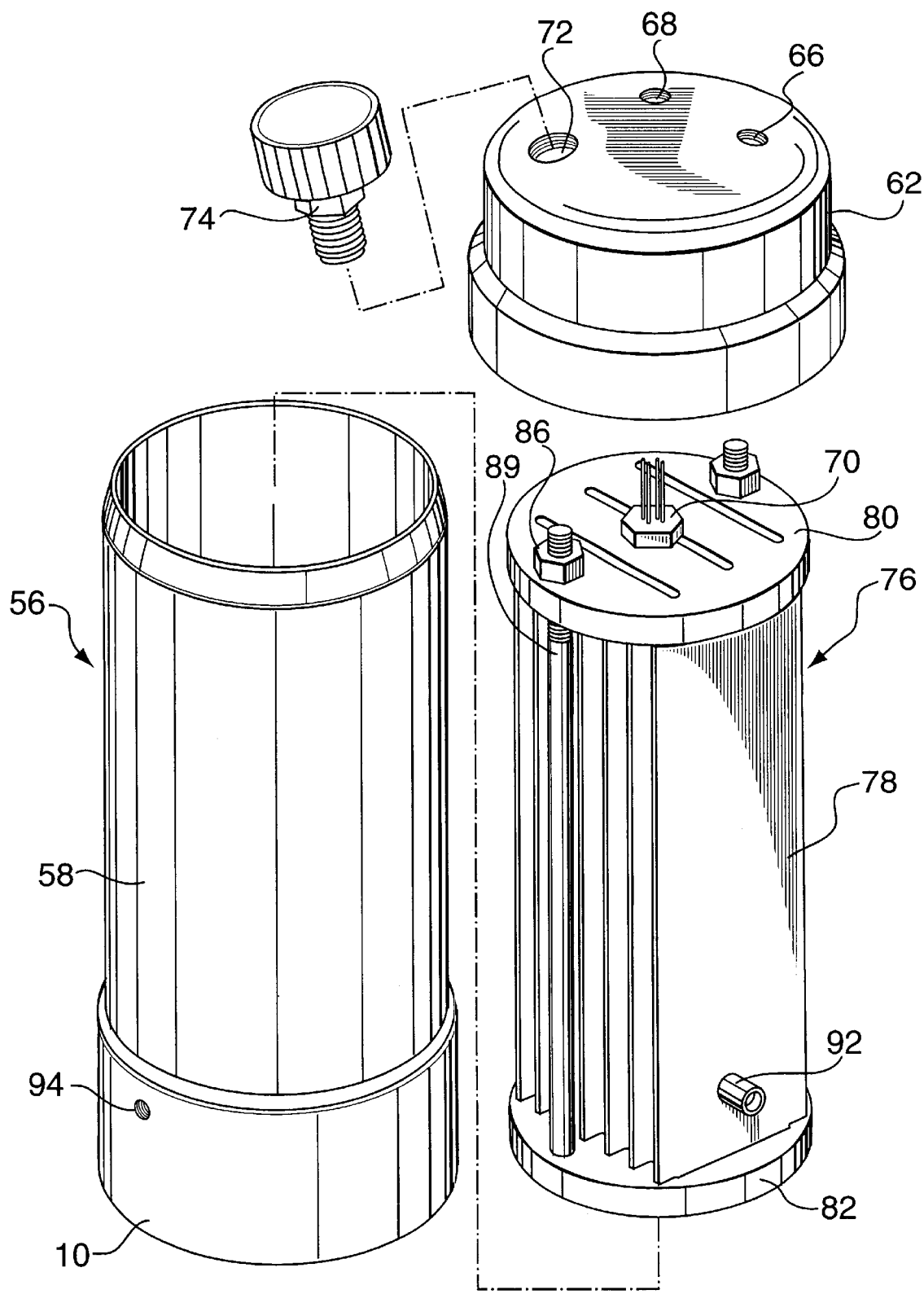
FIG. 2 is an exploded perspective view of the electrolysis cell of the hydrogen generating system of FIG. 1.
Figure 3:
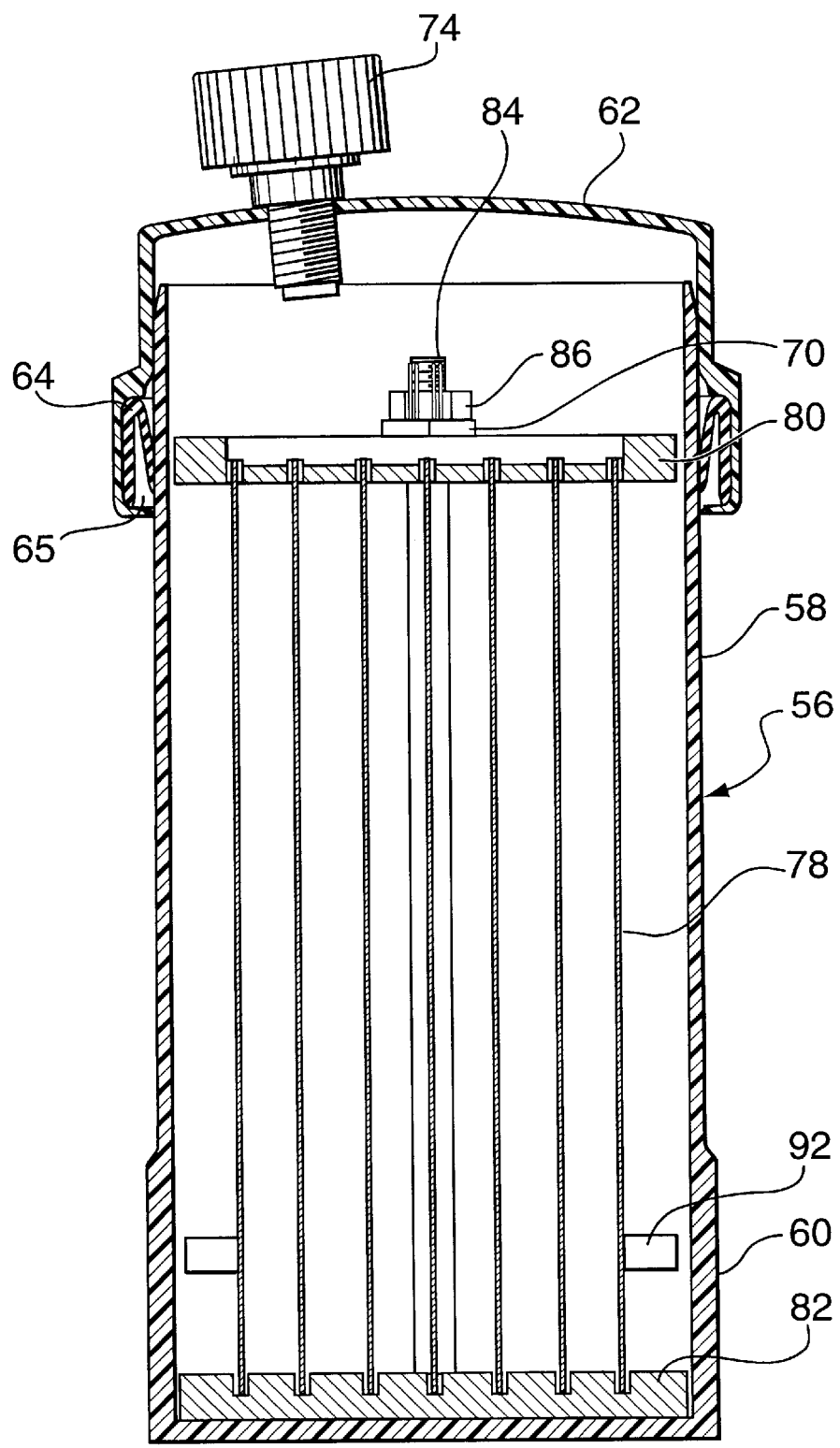
FIG. 3 is a side elevation view in cross section of the electrolysis cell of FIG. 2.

The details of a preferred embodiment of an electrolysis cell 10 of the present invention are shown in FIGS. 2 and 3. Electrolysis cell 10, preferably has a cylindrical shaped case 56, constructed of a suitable material which would be inert to the electrolyte solution and would not be affected by the voltages or temperatures encountered in the electrolysis cell 10. The case 56 should also preferably have a co-efficient of expansion which does not cause significant expansion of the dimensions of the cell 10 under the operating conditions of the hydrogen generating system. Preferably, the case 56 of the electrolysis cell 10 is a polyvinyl chloride. While the case 56 may be provided as a one-piece mold, it is preferred that for uniformity, the case 56 be in two sections, the sidewall 58 and the base 60 which are PVC welded to give the characteristics of a one-piece structure.

The electrolysis cell 10 is preferably provided with a cap 62 which has a slight dome shape to provide a gas accumulation zone. The junction between the sidewall 58 of the case 56 of the electrolysis cell 10 and the cap 62 is sealed by a U-shaped sealing member 64 of a suitable elastomeric material which is resistant to the effects of the electrolyte solution. The U-shaped seal 64 is placed within a groove 65 located in the interior of the cap 62. The U-shaped seal is provided with a generally vertical outer wall of a height and width to fit securely within the groove in the cap. The seal is further provided with top surface connecting the inner and outer walls. The inner wall of the seal has an inwardly canting sealing surface and is preferably provided with a lower surface region which cants inwardly at a greater angle than the upper surface region. It has been found that a U-shaped seal 64 as described provides for better sealing of the electrolysis cell 10 than a typical O-ring type seal. With the orientation of the U-shaped seal as described, efficient sealing under vacuum is achieved while also providing for ease of release of pressure or cap under conditions of excess pressure. If a vacuum is present in the gas accumulation zone, the vacuum will draw the lower surface region of the sealing surface of the inner wall against the outer sidewall surface of the case. If the pressure in the gas accumulation zone increases, the excess pressure will bias the lower surface region of the sealing surface of the inner wall away from the outer sidewall surface of the case, allowing the excess pressure to be released.

The cap 62 is provided with a first opening 66 for an outlet of the electrolysis cell 10 to which the tubing 14 is connected. Cap 62 is provided with a second opening 68 for electrical connection of the level and temperature sensors 70. A third opening 72 is provided in the cap 62 for receiving a fill plug 74. Fill plug 74 is removable to allow the addition of distilled water or electrolyte solution to the cell as the level of fluid in the electrolysis cell 10 decreases. Preferably, fill plug 74 also incorporates a pressure release mechanism to provide for relief of the pressure within the cell 10 should the interior pressure increase beyond a set limit. The fill plug also functions as a breather which filters the air entering the electrolysis cell and limits the air intake via a press fitted orifice designed to meet desired flow requirements.

The electrolysis cell 10 is provided with an electrode assembly 76. In the preferred embodiment illustrated in the Figures, electrode assembly 76 has a series of electrode plates 78 mounted between a top plate 80 and a bottom retainer plate 82 made of durable non-reactive materials compatible with the electrolyte solution. The electrode assembly 76 is held together by suitable bolts 84 and nuts 86. The electrodes 78 are provided as a series of bipolar electrode between an outside anode and cathode. The outside cathode and anode electrode plates 78 are provided with an adapter 92 for electrical connection to the positive and negative supply from the motor vehicle electrical system. When the electrode assembly 76 is placed within the case 56, adapters 92 are in alignment with openings 94 in the case 56 for connection of a terminal 96.

While the electrode assembly 76, as illustrated in the Figures, is shown as a series of electrode plates, other configurations of the electrode assembly are possible. Thus, for example, the electrode assembly could comprise a series of bar electrodes arranged in a suitable array. Alternatively, the electrode assembly could be a plurality of concentric circular electrodes. The electrode assembly 76 provides for a multi-cell bipolar electrode assembly for increased efficiency of the electrolysis reaction in the electrolysis cell 10. The materials from which the electrode assembly 76 is constructed are selected to minimize the effects of different coefficients of expansion of the materials, withstand strong corrosive action of the electrolyte solution and provide effective and efficient electrolysis process. Thus, preferably, the electrode plates 78 are a suitable stainless steel material, most preferably nickel plated stainless steel, and the top plate 80 and bottom plate 82 are polypropylene. Preferably, the bolt 84 and nut 86 are also a polypropylene material.

The fill plug can be a bi-directional relief valve which, in addition to providing for relief of the pressure in the interior of the cell should the pressure increase, is also utilized for air intake into the electrolysis cell 10. As the gas generated within the cell 10 by electrolysis is being drawn off by the vacuum pump 32, some air is allowed to enter the cell 10 through the filler plug 74 to balance the pressure within the interior of the cell 10. The air entering the cell also provides a secondary benefit of aiding in cooling of the electrolysis cell. The filler plug 74 is preferably provided with a suitable filter material to filter the incoming air.

The electrolyte solution utilized within the electrolysis cell 10, is preferably a basic aqueous solution to provide for increased efficiency of the electrolysis reaction. Preferably, the solution is also adjusted to remain in solution form and not freeze at extremely low temperatures, down to −40° or more. Most preferably, the electrolyte solution is a 20 to 30% KOH solution. The bubbler solution within the bubbler 18 is preferably a silicate free solution with a viscosity to allow the bubbles to break to the surface quickly and not accumulate within the solution.

A second embodiment of an electrolysis cell 110 of the present invention is illustrated in FIGS. 4 and 5. Similar to the first embodiment, electrolysis cell 110, preferably has a cylindrical shaped case 156, constructed of a suitable material inert to the electrolyte solution, not affected by the voltages or temperatures encountered in the electrolysis cell 110 and having a co-efficient of expansion which does not cause significant expansion of the dimensions of the cell 110 under the operating conditions of the hydrogen generating system. Preferably, the case 156 of the electrolysis cell 110 is a polyvinyl chloride provided in two sections, the sidewall 158 and the base 160 which are PVC welded to give the characteristics of a one-piece structure.

The electrolysis cell 110 is provided with a welded on cap 162. The cap 162 is provided with a first opening for an outlet of the electrolysis cell 110 to which a fitting 166 for the tubing is connected. Cap 162 is provided with a second opening 168 for receiving a fill plug 174. Fill plug 174 is removable to allow the addition of distilled water or electrolyte solution to the cell as the level of fluid in the electrolysis cell 110 decreases. Preferably, fill plug 174 also incorporates a pressure release mechanism to provide for relief of the pressure within the cell 110 should the interior pressure increase beyond a set limit.

The electrolysis cell 110 is provided with an electrode assembly 176. In the preferred embodiment illustrated in FIGS. 4 and 5, electrode assembly 176 has a pair of electrode plates 178 and 179 mounted between a top plate 180 and a bottom retainer plate 182 made of durable non-reactive materials compatible with the electrolyte solution. The electrode assembly 176 is held together by suitable bolts and nuts. The electrodes are provided as the combination of an outside anode 178 and a cathode 179 and a series of alternating parallel anodes 178 and cathodes 179. The individual anodes 178 and cathodes 179 are joined together by means of bridging straps 190 The outside cathode 179 and anode electrode plates 178 are provided with an adapter 192 to which a terminal 196 is attached for electrical connection to the positive and negative supply from the motor vehicle electrical system. When the electrode assembly 176 is placed within the case 156, adapters 192 are in alignment with openings 194 in the case 156 for connection of a terminal 196.

The electrode assembly 176 provides for a mono-cell monopolar electrode assembly for increased efficiency of the electrolysis reaction in the electrolysis cell 110. The materials from which the electrode assembly 176 is constructed are selected to minimize the effects of different coefficients of expansion of the materials, withstand strong corrosive action of the electrolyte solution and provide effective and efficient electrolysis process. Thus, preferably, the electrode plates 178 are a suitable stainless steel material, most preferably nickel plated stainless steel, and the top plate 180 and bottom plate 182 are polypropylene. Preferably, the bolt and nut are also a polypropylene material. While the electrode assembly 176, as illustrated in FIGS. 4 and 5, is shown as a pair of electrode plates, similar to the first embodiment, other configurations of the electrode assembly are possible.

The electrode assembly 176 of the electrolysis cell 110 of FIG. 4 is of a reduced height compared to the assembly of the cell 10 of FIG. 1. This reduced height provides for a larger electrolyte capacity and allows the cell 110 to operate for longer periods of time before fresh fluid must be added to the cell. This also provides for a larger safety margin as the operator is given a longer period of warning as the electrolyte fluid level is dropping in the cell 110. The electrolysis 110 cell of FIG. 4 is provided with a separator plate 198 to separate the electrolyte containing region from the gas accumulation zone. To reduce the amount of gases which are retained within the gas accumulation zone, the gas accumulation zone is filled with inert plastic spheres 200 such that the potential volume for the accumulation of gases is reduced. This in turn reducces the potential for danger should there be any malfuncctions in the system. An additional benefit of the balls is to act as a mechanical barrier for airborne liquid particles contained in generated gases.

Similar to the first embodiment, the electrolyte solution utilized within the electrolysis cell 110, is preferably a basic aqueous solution to provide for increased efficiency of the electrolysis reaction. Preferably, the solution is also adjusted to remain in solution form and not freeze at extremely low temperatures, down to −40° or more. Most preferably, the electrolyte solution is a 20 to 30% KOH solution.

Figure 6:
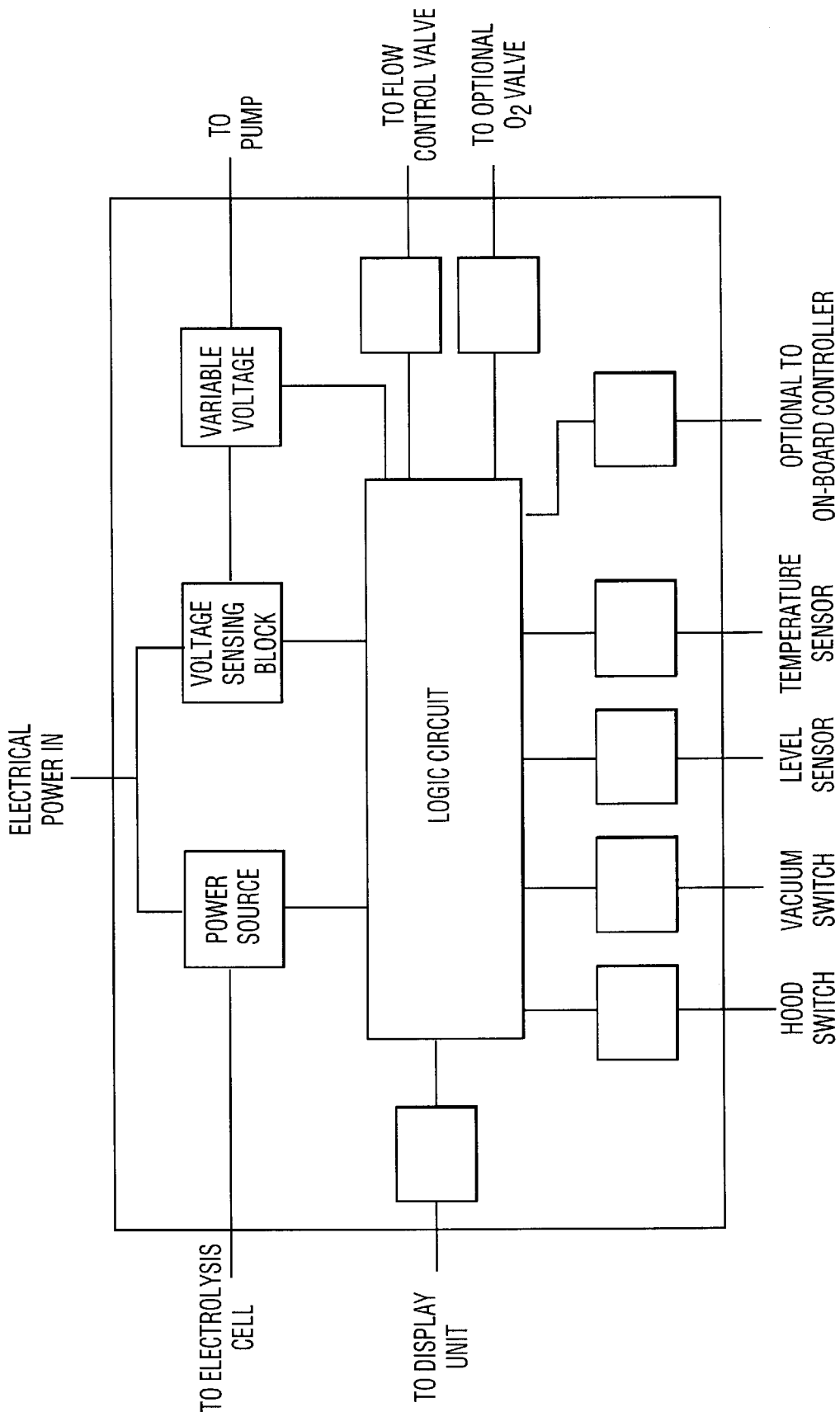
FIG. 6 is a block diagram of the electronic process controller of the hydrogen generating system of FIG. 1.
Figure 7A:
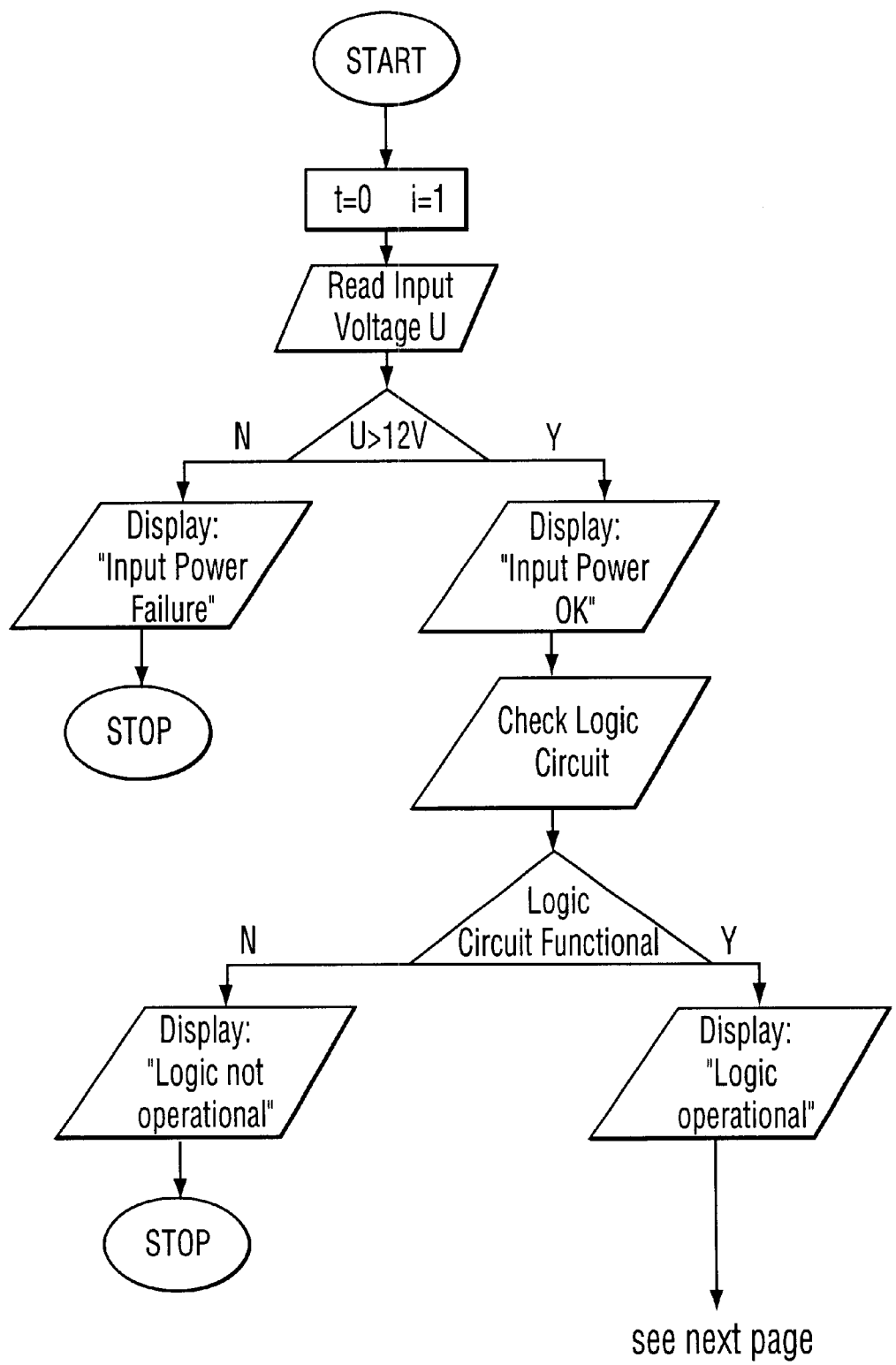
FIG. 7 is a flow chart of the operation of the electronic process controller of FIG. 6.
Figure 7B:
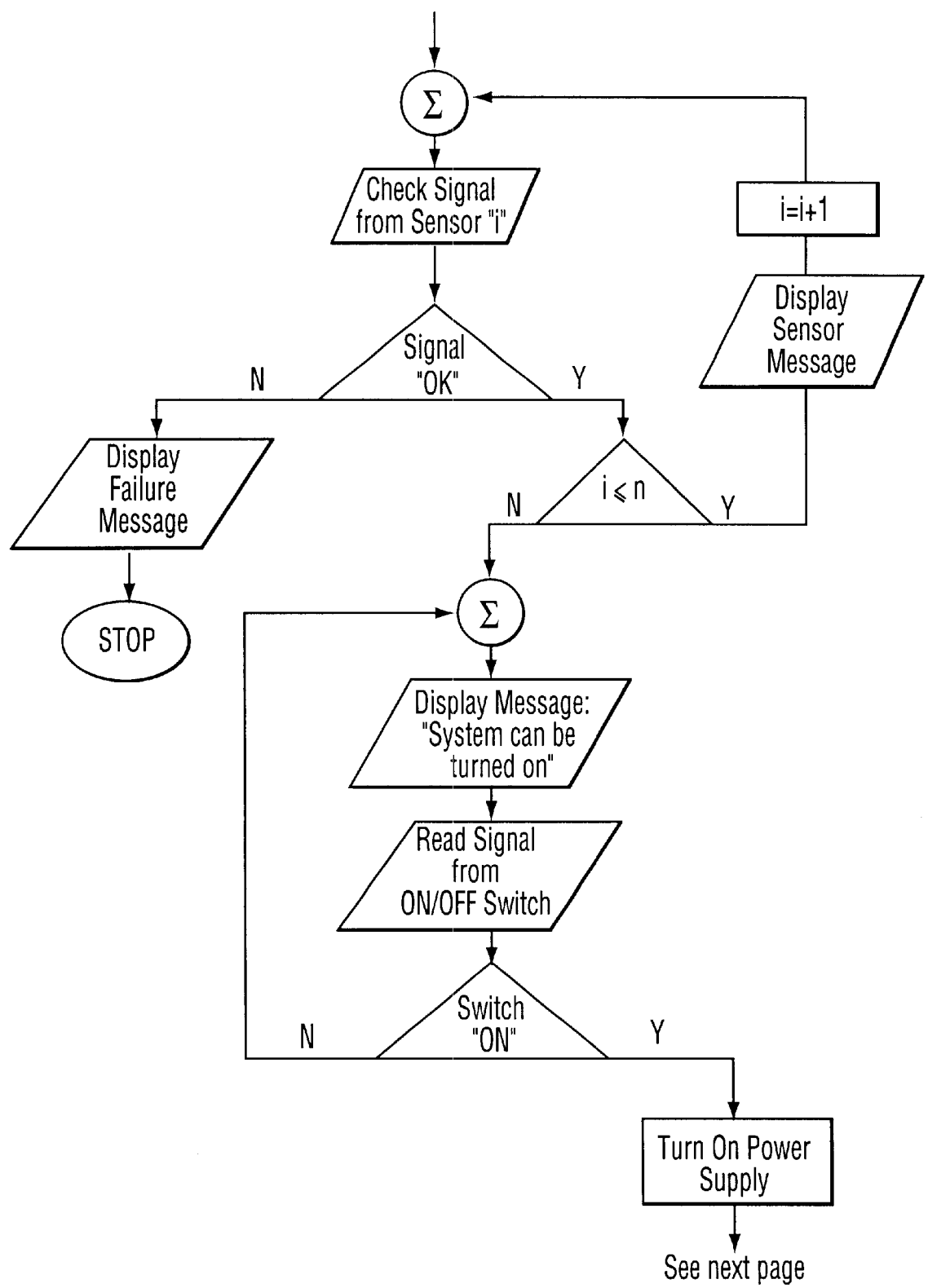
Figure 7C:
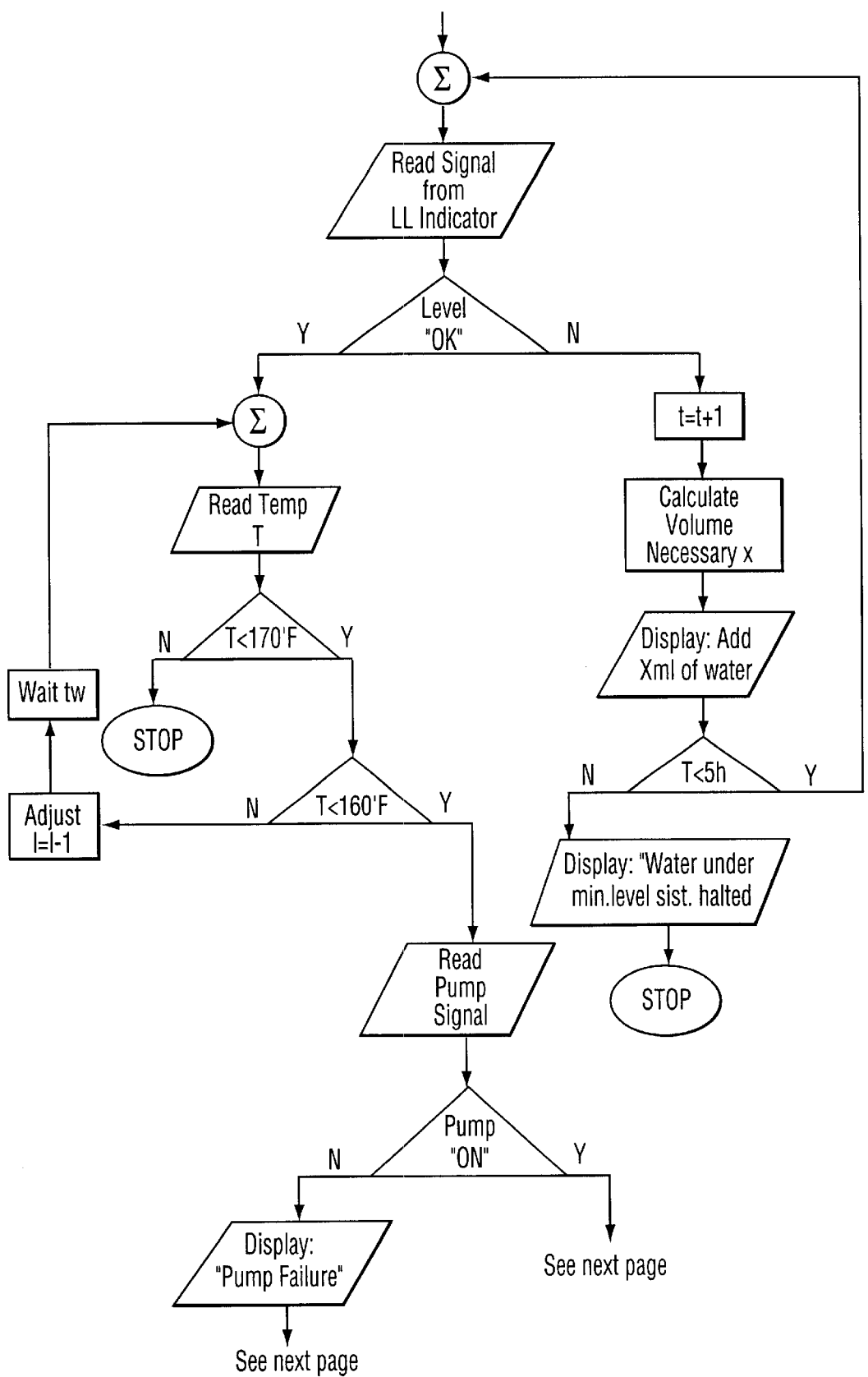
Figure 7D:
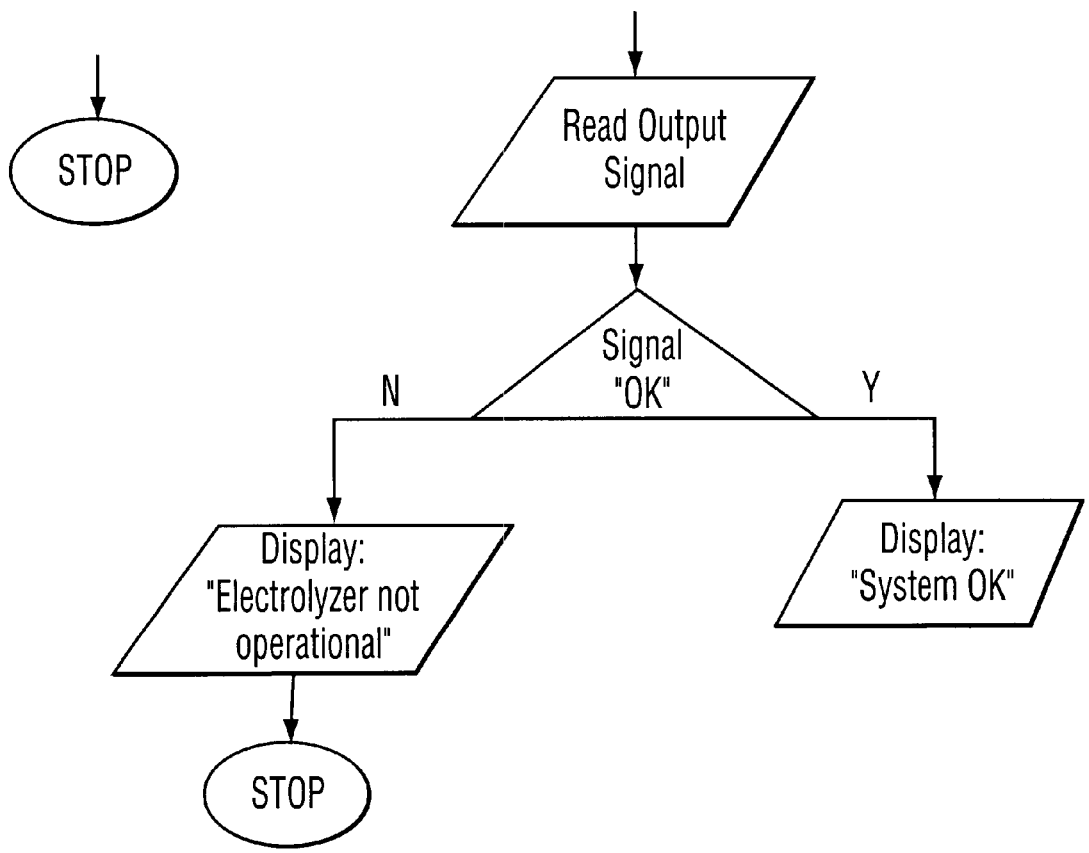

A preferred embodiment of the controller 40 of the present invention is illustrated in block diagram in FIG. 6. The controller 40 is provided with a logic circuitry 100 to control the operation of the controller. Logic circuitry 100 includes the programmed instructions for operation of the controller preferably stored within a non-volatile memory which may be part of the logic circuitry 100 or may be provided as a separate component of the controller 40. Controller 40 also includes suitable interfaces for interfacing the logic circuitry 100 to the sensors and switches of the hydrogen generating system. Depending upon the nature of the sensor or switch, the interface may be a simple interface to communicate to the logic circuitry that a signal is or is not present from the sensor or switch or the interface may provide an indication of the signal level from the sensor or switch.

For example, sensors which provide a digital output such as a TTL level sensor the output of the sensor could be directly connected to the logic circuitry. The signal could be converted into a "0" or "1" logic signal. The level of the fluid inside the electrolysis cell is then considered to be "full" or "not full". When a "not full" signal is present, the logic circuit will extrapolate the results to estimate the actual level of electrolyte inside the cell as described below. In these circumstances, the interface is preferably an analog/digital converter which converts the level of the signal from the sensor to a digital word which may then be processed by the logic circuitry 100. The non-volatile memory would include digital words corresponding to predetermined levels for the signals from the various sensors to enable the logic circuitry to determine if the signal is within acceptable ranges and hence whether the component of the hydrogen generating system is operating within an acceptable range.

The controller 40 is also provided with a power circuit to regulate the electrical power provided to the electrolysis cell. The controller 40 is connected to the electrical system of the motor vehicle to provide a source of electrical power for operation of the hydrogen generating system. A voltage sensing block is connected co the electrical power input to allow the logic circuit to measure and possibly compare voltage drops. The power circuit has an output to provide electrical power to the electrolysis cell at the proper level, the level of electrical power being under the control of the logic circuitry which interfaces with the power circuit. The amount of power supplied to the electrolysis cell controls the electrolysis reaction. As the amount of power being supplied is controlled by the controller, the controller can regulate the electrolysis reaction in response to monitored conditions including engine demand.

The controller may optionally be provided with variable power regulator for the pump to enable the logic circuitry to regulate the electrical power provided to the pump, and hence the flow rate of the pump, if a pump included as part of the system. In addition in those systems which utilize a variable flow control valve, the controller may be able to control the flow setting of the flow by means of and interface between the logic circuitry and the flow control valve. Another option available would be in those systems in which the output gases of the electrolysis cell are separated before introduction into the intake system of the motor vehicle. In those situations, the amount of one or both of the gases in the mixture being provided to the engine could be regulated. Preferably, the mixture of gases would be control by controlling the amount of oxygen in the mixture. This could be accomplished by providing an oxygen valve which would be controlled by the logic circuitry through an interface to regulate the amount of oxygen in the mixture. The excess oxygen produced by the electrolysis cell could be vented to the external environment.

Many later model motor vehicles utilize on-board controllers or computers to control various parameters of the operation of the engine of the motor vehicle particularly with respect to controlling exhaust gas pollution. For example, many vehicles are provided with sensors to determine the makeup of the exhaust gases or the fuel/air mixture being introduced into the engine. The on-board controller is capable of controlling the fuel/air mixture in response to monitored conditions to attempt to minimize as much as possible the amount of pollutants in the exhaust gas of the engine. The controller 40 of the present invention may be provided with an interface for the on-board controller to receive signals from the on-board controller as well as to provide signals to the on-board controller. For example, as the gases being generated by the electrolysis cell and introduced into the intake system of the engine would be high in oxygen content, an on-board controller that was monitoring oxygen content of either the fuel/air mixture or the exhaust gas may determine that the fuel/air mixture is too lean and may attempt to regulate the mixture to make it richer. In this situation, the controller 40 could provide a signal to the on-board controller to tell it that the high oxygen level is from the electrolysis reaction and not to adjust the richness of the mixture. The interface between the controller 40 and the on-board controller could also be utilized to monitor engine conditions to enable the controller 40 to control the electrolysis reaction depending upon engine conditions and demand. Thus under high load conditions the rate of electrolysis could be increased to increase the efficiency of the engine under high demand typical combustion conditions. In idle conditions the combustion would require different hydrogen amounts.

The controller 40 is also provided with an interface for a display module which is preferably mounted in the cab of the motor vehicle. Display module is as described above capable of displaying at least alphanumeric messages to provide the operator and diagnostic technician of the motor vehicle with an indication of the operation of the system and a warning of any problems which may arise in the system. The display module may also have the capability of displaying graphical images to graphically display the operation of the system and any problem areas. This would be particularly useful with those controllers which include an interface with an on-board controller used in later models motor vehicles.

The operation of a preferred embodiment of the controller of the present invention is illustrated in the flow chart of FIG. 7. On startup the controller resets certain of the variables stored in memory for example by setting the variable for the sensor number to 1 and, if desired, read values from the non-volitile memory. The controller then reads the level electrical power available for the system preferably by reading the level of the input voltage to determine if the level of the voltage is sufficient for proper operation of the system. While the level of voltage is the simplest to monitor, other indicators of electrical power including current could also be used. If the voltage level is below a preset level, typically about 12 volts, then the controller will display a system failure message such as shown in the Figure on the display and stop operation of the system. If desired, the controller could be programmed to recheck the electrical power level on a preprogrammed interval rather than merely stopping the system. This could be useful if the system was running on an auxiliary power source which may have to be recharged by the main electrical system of the motor vehicle. So long as the electrical power were below the operational level a message would be displayed to indicate this.

If the level of electrical power available for the system is acceptable, then the controller displays that the level is acceptable and proceeds to check the logic circuitry. If the logic circuitry is not functioning properly, then the controller will cause a message to be displayed and will stop operation of the hydrogen generating system. If the logic circuitry is functioning properly, then this will be displayed and the controller proceeds to test the sensors employed as monitoring means for monitoring the main safety features of the hydrogen generating system. Such safety features include the hood open switch and vacuum level switch. The controller could also test at least some of the sensors used to monitor the operating conditions at time such as the level sensor to monitor the level of solution in the electrolysis cell if desired.

The controller has stored in memory the identification of the various sensors and includes an indication of the number of such sensors used in the system. The controller uses a count up or count down function to test the sensors in sequence, the controller testing each sensor in sequence and then counting up or down until either the number equal to the total number of sensors or the counter reaches zero. Preferably, the controller uses a count up counter with the total number of sensors stored in memory. As illustrated in FIG. 7, the controller checks the signal from the first sensor, and if the signal is acceptable, displays the message, increments the counter and test the next sensor. This is repeated until all of the sensors have been tested and found acceptable. Should any of the sensors not be functioning properly, the controller displays the failure message and stops operation of the system.

Once the controller has tested all of the sensors, the hydrogen generating system is ready for power up. The controller could display a message to prompt the user to power on the main hydrogen generating system. The controller would then wait until a signal is received indicating that the main power switch has been turned on. Alternatively, the controller could automatically proceed with power up of the system once the main safety sensors have passed the functional test or a manual overide could be instigated by the operator of the system.

Once the signal for main power up is received by the controller, the controller turns on the power supply and then proceeds to monitor the sensors employed as monitoring means to monitor the operating conditions of the hydrogen generating system. These sensors include the level sensor and temperature sensor for monitoring the and then proceeds to monitor the sensors employed as monitoring means to monitor the operating conditions of the hydrogen generating system. These sensors include the level sensor and temperature sensor for monitoring the level and temperature of the solution in the electrolysis cell and for those systems using a pump to introduce the gases into the engine intake system, a pump sensor.

The controller reads the signal from the level sensor to determine the level of solution in the electrolysis cell. If the level is acceptable, the controller proceeds to read the signal from the next sensor monitoring the operating conditions of the hydrogen generating system. If the level of solution in the electrolysis cell is below acceptable levels, then the controller will calculate the amount of distilled or de-ionized water required to be added to the cell to bring the level up to within an acceptable range. The calculation is based upon the shape and overall volume of the electrolysis cell as well as the operating time elapsed since the level initially dropped below the acceptable range. For the preferred embodiment of the electrolysis cell illustrated in the figure being a cylinder of 6 in. diameter, 10 in. height and containing 3.35 to 3.45 ml of electrolyte solution, the formula would be:

$$x = \frac{12}{\int_0^{ti} i\,dt} \cdot f\left(\frac{150}{\int_0^{ti} T\,dt}\right) \cdot \frac{150}{1440} \cdot ti$$

Where $t_1$, is elapsed time since the logic signal "not full" received $i=i(t)$ and $T=T(t)$—current and temperature profile over $t\in(0,t_1) \Leftrightarrow 0 \leq t \leq t_1$ safety level based upon the operating conditions of the hydrogen generating system, then the controller will stop the operation of the system and display a warning message. In order to properly monitor the elapsed time when the vehicle is being used for intermittent operation, the elapsed time is preferably stored in non-volatile memory.

The controller also monitors the temperature of the solution in the electrolysis cell to maintain the temperature within an acceptable range. As noted above, the acceptable temperature range will vary according to cell design, materials and nature of electrolyte solution. The temperature in the cell should be below 170° F. and preferably below 160° F. If the temperature is above 160° F., then the controller reduces the electrical power to the cell to slow down the electrolysis reaction. Preferably the electrical power to the electrolysis cell is controlled by controlling the current applied to the cell. When the temperature is above 160° F., the controller reduces the current by a factor of 15% and then monitors the temperature to ensure that the temperature decreases to acceptable levels. If the temperature has not decreased within a specified time, typically on the order of 30 minutes, then the controller reduces the current further and continues monitoring the temperature. If the temperature has not reduced after a predetermined number of repetitions or if the temperature ever is above 170° F., the controller stops operation of the system and displays a fault message.

For those hydrogen generating systems which employ a pump for introduction of the gases into the intake system of the engine, the controller also monitors the operation of the pump. Preferably, the controller monitors the operation of the pump by reading a signal corresponding to the current draw of the pump. If the current draw is within a range which indicates proper operation of the pump, then the controller displays this on the display module. If the current draw is not within acceptable range, either being too low, indicating a pump malfunction or too high indicating a pump blockage, then the controller displays a pump failure message and stops operation of the system.

If all of the components of the system are functioning properly as indicated by the signals from the various sensors provided to the controller, the controller will display a System OK message on the display module. The controller continues to monitor both the sensors for the main safety features as well as the sensors for the operating parameters of the system while the system is in operation. So long as all components are functioning properly, the controller continues to display the System OK message. Should the controller determine that one of the components is not functioning properly or is not operating within acceptable range, then the relevant problem message is displayed and the controller carries out the programmed steps in accordance with the problem according to the flow chart shown in FIG. 7. Should one of the main safety sensors indicate a problem, such as the hood open switch indicating that the hood has been opened, then the controller immediately stops the operation of the system and displays the relevant trouble message.

The hydrogen generating system of the present invention provides for a efficient generation of hydrogen and oxygen by electrolysis of water within the electrolysis cell 10. The electrolysis reaction is under the control of the electronic process controller 40 to adjust the rate of the reaction in response to engine conditions. This may be accomplished by regulating the amount of electrical energy provided to the cell 10 to regulate the electrolysis reaction and the amount of gases being generated from the reaction. In addition, the flow control valve 30 may also be an adjustable valve with the flow rate being controlled by the process controller 40. The hydrogen generating system of the present invention may optionally be provided with a separator to separate the hydrogen and oxygen gases given off in the electrolysis reaction, if desired. In this way, the amount of the hydrogen and oxygen gas provided to the engine may be regulated by the electronic process controller 40 to maximize the performance of the engine.

Figure 8A:
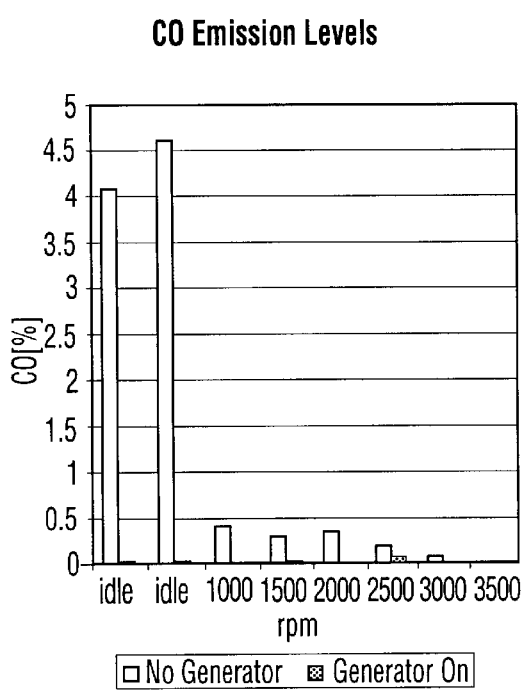
FIG. 8 is a series of graphs illustrating the performance of an engine with the hydrogen generating system of FIG. 1 installed.
Figure 8B:
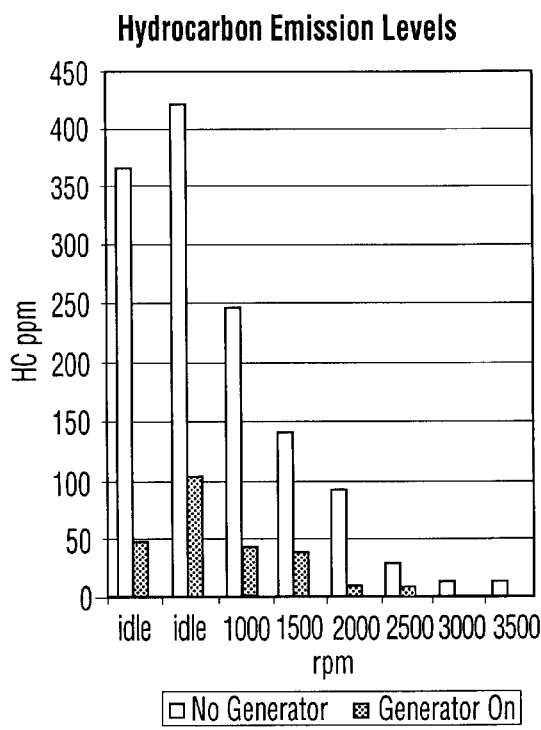
Figure 8C:
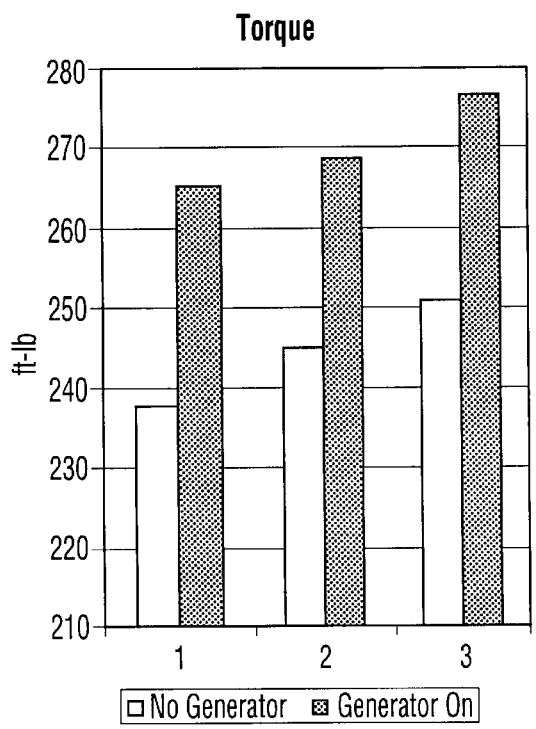
Figure 8D:
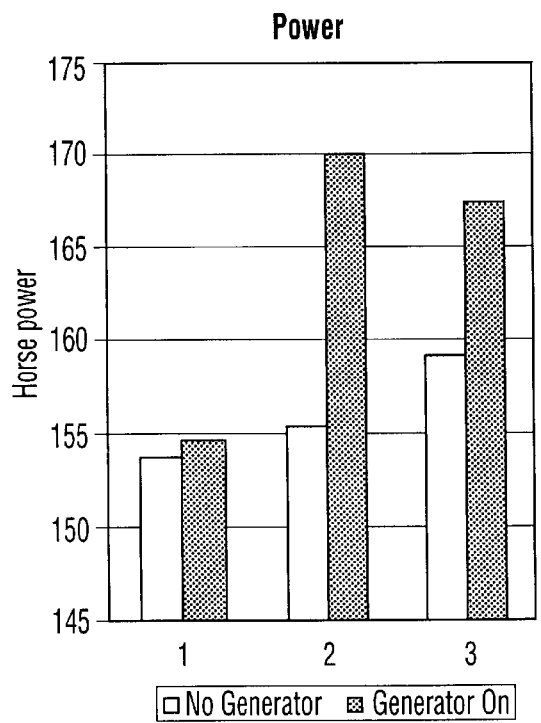

A prototype model of the hydrogen generating system of the present invention was installed on a GMC Suburban for testing purposes. The results of the tests are illustrated in FIG. 8. As shown in FIG. 8a, there was a significant reduction in carbon monoxide emission levels, particularly at engine idle, where the levels decreased from a range of 4.08–4.61 to 0.02–0.04. Decreases in the level of the carbon monoxide emissions were observed over the full operating range of the engine and carbon monoxide emissions at some of these levels were so low they were not able to be detected. Similarly, as shown in FIG. 1b, hydrocarbon emission levels were also reduced significantly with reductions as high as 90% being observed. The use of the hydrogen generating system of the present invention also resulted in increased performance of the engine as illustrated in FIGS. 8c and 8d where the engine torque was shown to increase by approximately 10% and increases of up to 10% in the horse power output of the engine were also observed.

Although various preferred embodiments of the present invention have been described herein in detail, it will be appreciated by those skilled in the art that variations may be made thereto without departing from the spirit of the invention or the scope of the appended claims.

What is claimed is:

1. A hydrogen generating system for use in providing a supplementary fuel source in an internal combustion engine for increasing the efficiency of the engine and decreasing emissions from the engine, the hydrogen generating system comprising:

an electrolysis cell for generating hydrogen and oxygen gases by electrolysis of an aqueous solution, the electrolysis cell positioned in a compartment having a closeable hood positioned thereover;

a power source for providing electrical power to the electrolysis cell;

an outlet flow means for introducing the generated gases into an intake manifold system of the internal combustion engine;

a master switch for setting an on condition and an off condition;

a hood safety switch for setting an off condition when the hood over the electrolysis cell is opened and for setting an on condition when the hood over the electrolysis cell is closed;

an engine operation monitoring means setting an off condition when the engine is not operating and an on condition when the engine is operating; and a control means in communication with the master switch, the hood safety switch and the engine operation monitoring means and the control means preventing operation of the electrolysis cell in response to an off condition in any of the master switch, the hood safety switch or the engine operation monitoring means.

2. A hydrogen generating system for use in providing a supplementary fuel source in an internal combustion engine for increasing the efficiency of the engine and decreasing emissions from the engine, the hydrogen generating system comprising:

an electrolysis cell for generating hydrogen and oxygen gases by electrolysis of an aqueous solution, the electrolysis cell including a case for containing the aqueous solution and at least a pair of electrodes, a cap for fitting over an open upper end of the case and an elastomeric sealing ring contained in an annular groove therebetween, the sealing member being U-shaped in cross section and having an inner wall, an outer wall and a top surface connecting the inner wall and the outer wall, the inner wall including an inwardly canting sealing surface and the sealing ring being oriented in the groove such that the top surface is positioned adjacent the open upper end of the case;

a power source for providing electrical power to the electrolysis cell; and an outlet flow means for introducing the generated gases into an intake manifold system of the internal combustion engine.

3. The hydrogen generating system of claim 1 wherein the engine operation monitoring means is an oil pressure switch.

4. The hydrogen generating system of claim 1 wherein the outlet flow means includes a pump for pumping the generated gases to the intake manifold system.

5. The hydrogen generating system of claim 1 wherein the hood is a motor vehicle trunk lid.

6. The hydrogen generating system of claim 1 wherein the hood is an engine compartment lid.

7. The hydrogen generating system of claim 1 wherein the control means regulates transmission of power from the power source to the electrolysis cell.

8. The hydrogen generating system of claim 1 further comprising an aqueous solution low level switch for monitoring the level of the aqueous solution within the electrolysis cell and setting an off condition when the aqueous solution is below a selected level and the control means being in communication with the aqueous solution low level switch and preventing operation of the electrolysis cell in response to an off condition in the aqueous solution low level switch.

9. The hydrogen generating system of claim 1 wherein prior to initiating operation of the electrolysis cell, the control means selected to monitor each of the master switch, the hood safety switch and the engine operation monitoring means for an off condition.

10. The hydrogen generating system of claim 1 wherein the control means is selected to deactivate the electrolysis cell during electrolysis cell operation in response to the occurrence of an off condition in any of the master switch, the hood safety switch and the engine operation monitoring means.

11. The hydrogen generating system of claim 1 wherein the outlet flow means includes a pump for pumping the generated gases to the intake manifold system and the hydrogen generating system further comprising a means for monitoring electrical power to the pump and setting an off condition when there is no electrical power provided to the pump and the control means being in communication with the means for monitoring electrical power to the pump and preventing operation of the electrolysis cell in response to an off condition in the means for monitoring electrical power to the pump.

12. The hydrogen generating system of claim 1 wherein the internal combustion engine has an operator compartment associated therewith and the master switch is located in the operator compartment.

13. The hydrogen generating system of claim 1 further comprising a display module for displaying system feedback information.

14. The hydrogen generating system of claim 13 wherein the system feedback information is displayed in alphanumeric format.

15. The hydrogen generating system of claim 14 wherein the control means has stored in memory the identification of each of the master switch, the hood safety switch and the engine operation monitoring means and includes a function to test the condition of each in sequence and the control means providing feedback information to the display module to display the condition of the master switch, the hood safety switch and the engine operation monitoring means.

16. The hydrogen generating system of claim 1 wherein the control means has stored in memory the identification of each of the master switch, the hood safety switch and the engine operation monitoring means and includes a function to test the condition of each in sequence.

17. The hydrogen generating system of claim 1 further comprising a display module for displaying system feedback information and wherein the control means has stored in memory the identification of each of the hood safety switch and the engine operation monitoring means and includes a function to test the condition of each in sequence, the control means further being in communication with the display module to display the result of the test and to prompt a user to bring the master switch to the on condition if no off condition is sensed in any of the hood safety switch or the engine operation monitoring means.

* * * * *